Sept. 23, 1958
R. RICHTER ET AL
2,852,978
WIDE ANGLE ANASTIGMATIC OBJECTIVE FOR
AERIAL PHOTOGRAPHY AND PROJECTION
Filed April 25, 1957
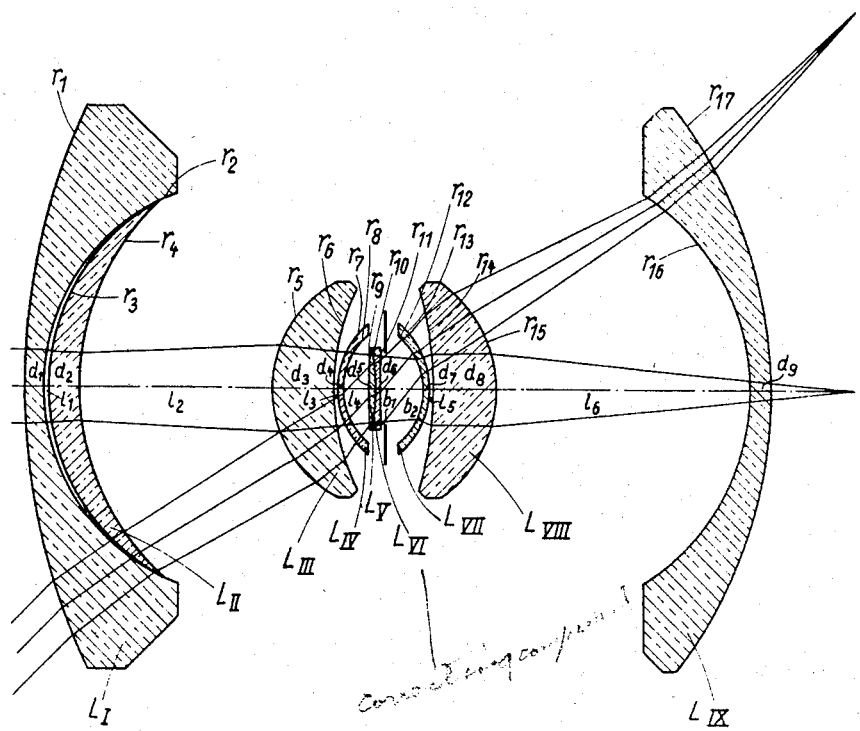

United States Patent Office

2,852,978
Patented Sept. 23, 1958

2,852,978

WIDE ANGLE ANASTIGMATIC OBJECTIVE FOR AERIAL PHOTOGRAPHY AND PROJECTION

Robert Richter, deceased, late of Aalen, Germany, by Irma Richter, heiress, Aalen, Germany, and Friedrich Koch, deceased, late of Heidenheim (Brenz), Germany, by Frida Koch, Heidenheim (Brenz), Germany, and Ingrid Schickl, Bogota, Columbia, heiresses, assignors to Carl Zeiss, Heidenheim (Brenz), Germany Application April 25, 1957, Serial No. 655,459

Claims priority, application Germany May 4, 1956

3 Claims. (Cl. 88—57)

The present invention concerns an improvement of anastigmatic objectives for photography and projection which contain four meniscus-shaped basic members, more particularly two collective and two dispersive members which latter are enclosed by the collective members wherein the eight external surfaces of these four members all turn their hollow surfaces towards the space lying between the dispersive members and wherein the surfaces of the two dispersive members bordering upon this space have an axial separation from each other which is larger than ⅕ of the mean of the radii of curvature of these surfaces. Objectives of this type which have become known by the U. S. Patent No. 2,031,792 have undergone an improvement according to the copending U. S. Patent application, Ser. No. 505,892 filed May 4, 1955, now Patent No. 2,836,100, dated May 27, 1958, which improvement relates particularly to the flattening of the image field and to the distortion with simultaneous raising of the marginal illumination in that on both sides of these basic members there are provided at least one further dispersive single lens as external members which turn their more deeply curved faces also towards the aforesaid space and in that within this aforesaid space a correcting system is arranged which has collective refractive power whose value amounts at most to ½ the value of the refractive power of the entire objective, therein the corrective system which is arranged at the place of the narrowest waist of the bundle of rays between the two halves of the entire system has the strongest effect upon the improvement of the zonal astigmatic aberrations in spite of low refractive power and if it is provided with lenses of suitable chromatic dispersion it also has the greatest effect upon the elimination of the chromatic variations of the image curvature. The present application is a continuation in part of applicants' copending application, Serial No. 505,892, filed May 4, 1955, and above mentioned.

Object of the present invention is a further improvement of objectives of this type with respect to the chromatic difference of magnification and to the dependence on colour of the distortion. This can be attained according to the invention in that at least one of the two single dispersive lenses standing as the external members is supplemented by a collective lens whose glass shows a stronger chromatic dispersion than the glass of the corresponding dispersive single lens.

In an advantageous embodiment of an objective according to the invention there is arranged at least the collective lens coordinated to the front lens separated from it by a small air space.

Especially for the use of an objective of this type as a taking objective for aerial photogrammetry this has the advantage that the aforesaid lenses standing as front members which have a comparatively large free diameter do not suffer strain under larger variations of temperature which could occur in cemented lenses principally because these lenses are arranged externally.

With advantage the supplementation of the dispersive single lenses by a collective lens in an embodiment according to the invention is carried out in such a way that the collective lens concerned is arranged on the side of the more deeply curved surface of the corresponding dispersive single lens.

In the accompanying figure of the drawing an embodiment of an objective according to the invention is represented and in the table given in the following the measurements of the radii and axial separations of the lens surfaces are given as well as the thicknesses of the lenses and further the refractive indices and the Abbe numbers of the glasses used in this embodiment.

Herein there is designated

L the single lenses,
r the radii of the lens surfaces,
d the thicknesses,
l the axial separations of the individual lenses,
b the position of the diaphragm,
$n_d$ the refractive indices, and
$v$ the Abbe numbers of the glasses in the lenses.

The values of this computed example refer to a focal length of $f=100$.

The objective shows an aperture ratio of 1:5.6 and fully covers an image angle of 90°.

Embodiment

| Lenses | Radii | Thicknesses and separations | $n_d$ | $v$ |
|---|---|---|---|---|
| $L_I$ | $r_1 = +171.42$ | $d_1 = 4.59$ | 1.60311 | 60.7 |
|  | $r_2 = + 54.203$ | $l_1 = 1.03$ |  |  |
|  | $r_3 = + 54.989$ |  |  |  |
| $L_{II}$ |  | $d_2 = 8.23$ | 1.72825 | 28.3 |
|  | $r_4 = + 65.826$ | $l_2 = 50.88$ |  |  |
|  | $r_5 = + 31.598$ |  |  |  |
| $L_{III}$ |  | $d_3 = 16.46$ | 1.60562 | 60.7 |
|  | $r_6 = + 58.668$ | $l_3 = 0.55$ |  |  |
|  | $r_7 = + 21.891$ |  |  |  |
| $L_{IV}$ |  | $d_4 = 1.10$ | 1.78472 | 25.7 |
|  | $r_8 = + 18.553$ | $l_4 = 6.86$ |  |  |
|  | $r_9 = +196.52$ |  |  |  |
| $L_V$ |  | $d_5 = 1.85$ | 1.62041 | 60.3 |
|  | $r_{10} = - 54.989$ |  |  |  |
| $L_{VI}$ |  | $d_6 = 1.03$ | 1.62004 | 36.3 |
|  | $r_{11} = +639.59$ | $b_1 = 0.82$ |  |  |
|  |  | $b_2 = 10.97$ |  |  |
|  | $r_{12} = - 18.553$ |  |  |  |
| $L_{VII}$ |  | $d_7 = 1.10$ | 1.78472 | 25.7 |
|  | $r_{13} = - 21.891$ |  |  |  |
|  | $r_{14} = - 94.331$ | $l_5 = 0.55$ |  |  |
| $L_{VIII}$ |  | $d_8 = 17.0$ | 1.60881 | 46.2 |
|  | $r_{15} = - 33.955$ | $l_6 = 67.20$ |  |  |
|  | $r_{16} = - 59.092$ |  |  |  |
| $L_{IX}$ |  | $d_9 = 5.13$ | 1.60311 | 60.7 |
|  | $r_{17} = -118.75$ |  |  |  |

What is claimed is:

1. A wide angle anastigmatic objective for aerial photography and projection purposes of the basic form containing at least two negative meniscus inner components concave toward each other and enclosing a central inner air space and a diaphragm therein, and two positive meniscus outer components located one on each side of and concave toward the said negative components and all axially aligned and air spaced apart, said four components being corrected especially for spherical aberration, two further negative meniscus components each being operatively positioned on one side and enclosing the said four meniscus components as exterior components axially aligned with respect to the whole objective and turning their concave inner surfaces toward said positive components and having air separations from said positive components of between $.2 \cdot f$ and $.8 \cdot f$, the radius of the outer convex surfaces of each of said dispersive exterior components lying between $1.0 \cdot f$ and $2.5 \cdot f$ and the radius of their inner concave surfaces lying between $.45 \cdot f$ and $1.5 \cdot f$, said inner central air space being greater than 80% and smaller than 200% of the arithmetic mean of the radii of curvature of the inner concave surfaces of said negative components bounding said air space, and a substantially afocal correcting component located near the diaphragm position for correcting for residual astigmatic zonal aberration said correcting component having spherical outer surfaces the radii of which lying between $-1.5 \cdot f$ and $+1.5 \cdot f$, the mean refractive index of said correcting component in combination with the said outer radii being such that its refractive power lies between zero power and $+.5/f$, $f$ being the focal length and $1/f$ the focal power of the whole objective, and at least one of the said further negative outer meniscus components being composed of a negative lens element and a positive lens element, the latter being made of a glass material having a stronger chromatic dispersion than the glass material of the said negative lens element in the respective said negative outer meniscus component.

2. A wide angle anastigmatic objective according to claim 1 with the said positive lens element in at least one of the said further negative outer meniscus components located and separated by a small air space from the said negative lens element in the respective said negative outer meniscus component.

3. A wide angle anastigmatic objective according to claim 1 with the said positive lens element in at least one of the said further negative outer meniscus components located on the side of more strongly curved surface of the said negative lens element in the respective said negative outer meniscus component.

References Cited in the file of this patent

UNITED STATES PATENTS

| | | |
|---|---|---|
| 2,031,792 | Richter | Feb. 25, 1936 |
| 2,430,150 | Warmisham | Nov. 4, 1947 |
| 2,516,724 | Roossinov | July 25, 1950 |
| 2,721,499 | Bertele | Oct. 25, 1955 |
| 2,789,463 | Kohler et al. | Apr. 23, 1957 |

FOREIGN PATENTS

| | | |
|---|---|---|
| 1,088,265 | France | Sept. 8, 1954 |
| 1,125,357 | France | July 9, 1956 |
| 743,289 | Great Britain | Jan. 11, 1956 |